(12) United States Patent
Tomozawa et al.

(10) Patent No.: US 12,115,976 B2
(45) Date of Patent: Oct. 15, 2024

(54) DRIVING ASSISTANCE DEVICE AND VEHICLE

(71) Applicants: AISIN CORPORATION, Aichi (JP); TOYOTA JIDOSHA KABUSHIKI KAISHA, Toyota (JP)

(72) Inventors: Motokatsu Tomozawa, Kariya (JP); Tsutomu Mochida, Toyota (JP); Shinya Otani, Nagoya (JP); Shinya Sannodo, Toyota (JP)

(73) Assignees: AISIN CORPORATION, Aichi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 109 days.

(21) Appl. No.: 17/952,617

(22) Filed: Sep. 26, 2022

(65) Prior Publication Data

US 2023/0096747 A1   Mar. 30, 2023

(30) Foreign Application Priority Data

Sep. 29, 2021   (JP) ................................. 2021-159891

(51) Int. Cl.
*B60W 30/06* (2006.01)
*B60W 40/06* (2012.01)
*G05D 1/00* (2024.01)
*G06V 20/58* (2022.01)

(52) U.S. Cl.
CPC ............ *B60W 30/06* (2013.01); *B60W 40/06* (2013.01); *G05D 1/0016* (2013.01); *G06V 20/586* (2022.01); *B60W 2420/403* (2013.01)

(58) Field of Classification Search
CPC .. B60W 30/06; B60W 40/06; B60W 2420/42; G05D 1/0016; G05D 2201/0213; G06V 20/586; G06V 20/56; B62D 15/0285
See application file for complete search history.

(56) References Cited

FOREIGN PATENT DOCUMENTS

| EP | 1038734 A1 * | 9/2000 | ............... B60R 1/00 |
| JP | 2018-030580 A | 3/2018 | |
| JP | 2021-066286 A | 4/2021 | |

* cited by examiner

*Primary Examiner* — Daryl C Pope
(74) *Attorney, Agent, or Firm* — Sughrue Mion, PLLC

(57) ABSTRACT

A driving assistance device that provides assistance to a vehicle including a sensor, collecting peripheral information, includes a detection unit that detects an obstacle and a parking area at a vehicle periphery; a road width calculation unit that calculates an area between first and second boundary lines as a road width; a route calculation unit that calculates a movement route through the area and the parking area to a target position; and a movement control unit that moves the vehicle along the movement route; where when a second obstacle is detected on the inside of the first and second boundary lines and on the second boundary line side with respect to the vehicle, and the second obstacle is continuously detected when the vehicle reaches a predetermined timing, an area between a third boundary line extending in the predetermined direction and the first boundary line is detected as new road width.

12 Claims, 12 Drawing Sheets

DRIVING ASSISTANCE DEVICE AND VEHICLE

CROSS REFERENCE TO RELATED APPLICATIONS

This application is based on and claims priority under 35 U.S.C. § 119 to Japanese Patent Application No. 2021-159891, filed on Sep. 29, 2021, the entire content of which is incorporated herein by reference.

TECHNICAL FIELD

The present disclosure relates to a driving assistance device and a vehicle.

BACKGROUND DISCUSSION

A known driving assistance device that provides driving assistance at the time of entering and exiting of a vehicle is disclosed in Japanese Unexamined Patent Publication No. 2018-030580 and Japanese Unexamined Patent Publication No. 2021-066286. In the driving assistance device, a movement route of the vehicle to entering or exiting is calculated, and the vehicle is moved based thereon. When calculating the movement route of the vehicle, the driving assistance device calculates a road width in which the vehicle can move based on, for example, an obstacle located on the opposite side of the parking area.

In recent years, a driving assistance device that remotely provides driving assistance for entering and exiting in a state where a driver has got off a vehicle has been developed. In such a driving assistance device, a driver who got off the vehicle may be recognized as an obstacle, and the road width may be calculated based on the driver. In this case, the road width may be recognized to be unnecessarily narrow, and the driving assistance of the vehicle may be canceled.

A need thus exists for a driving assistance device and a vehicle which are not susceptible to the drawback mentioned above.

SUMMARY

A driving assistance device is a driving assistance device that provides driving assistance to a vehicle including a sensor that collects peripheral information in accordance with an instruction from a terminal possessed by a user of the vehicle, the driving assistance device including: a detection unit that detects an obstacle and a parking area at a periphery of the vehicle based on the peripheral information from the sensor; a road width calculation unit that calculates, as a road width in which the vehicle is movable, an area sandwiched by a first boundary line extending in a predetermined direction including an end portion of the parking area on an entrance side and a second boundary line extending in the predetermined direction including an end portion of the first obstacle on the vehicle side facing the end portion of the parking area; a route calculation unit that calculates a movement route of the vehicle through the area sandwiched by the first and second boundary lines and the parking area to a target position, the parking area being a departure position or the target position; and a movement control unit that moves the vehicle along the movement route; where when a second obstacle is detected on the inner side of the first and second boundary lines and on the second boundary line side with respect to the vehicle in an advancing direction of the vehicle after the start of the driving assistance, and the second obstacle is continuously detected at a time point the vehicle moving on the movement route reaches a predetermined timing, the road width calculation unit calculates an area sandwiched by a third boundary line extending in the predetermined direction including an end portion of the second obstacle on the vehicle side and the first boundary line as a new road width.

A vehicle is a vehicle mounted with a sensor that collects peripheral information; and a driving assistance device that provides driving assistance in accordance with an instruction from a terminal possessed by a user, where the driving assistance device includes a detection unit that detects an obstacle and a parking area of a periphery of the vehicle based on the peripheral information from the sensor; a road width calculation unit that calculates, as a road width in which the vehicle is movable, an area sandwiched by a first boundary line extending in a predetermined direction including an end portion of the parking area on an entrance side and a second boundary line extending in the predetermined direction including an end portion of the first obstacle on the vehicle side facing the end portion of the parking area; a route calculation unit that calculates a movement route of the vehicle through the area sandwiched by the first and second boundary lines and the parking area to a target position, the parking area being a departure position or the target position; and a movement control unit that moves the vehicle along the movement route; where when a second obstacle is detected on the inner side of the first and second boundary lines and on the second boundary line side with respect to the vehicle in an advancing direction of the vehicle after the start of the driving assistance, and the second obstacle is continuously detected at a time point the vehicle moving on the movement route reaches a predetermined timing, the road width calculation unit calculates an area sandwiched by a third boundary line extending in the predetermined direction including an end portion of the second obstacle on the vehicle side and the first boundary line as a new road width.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
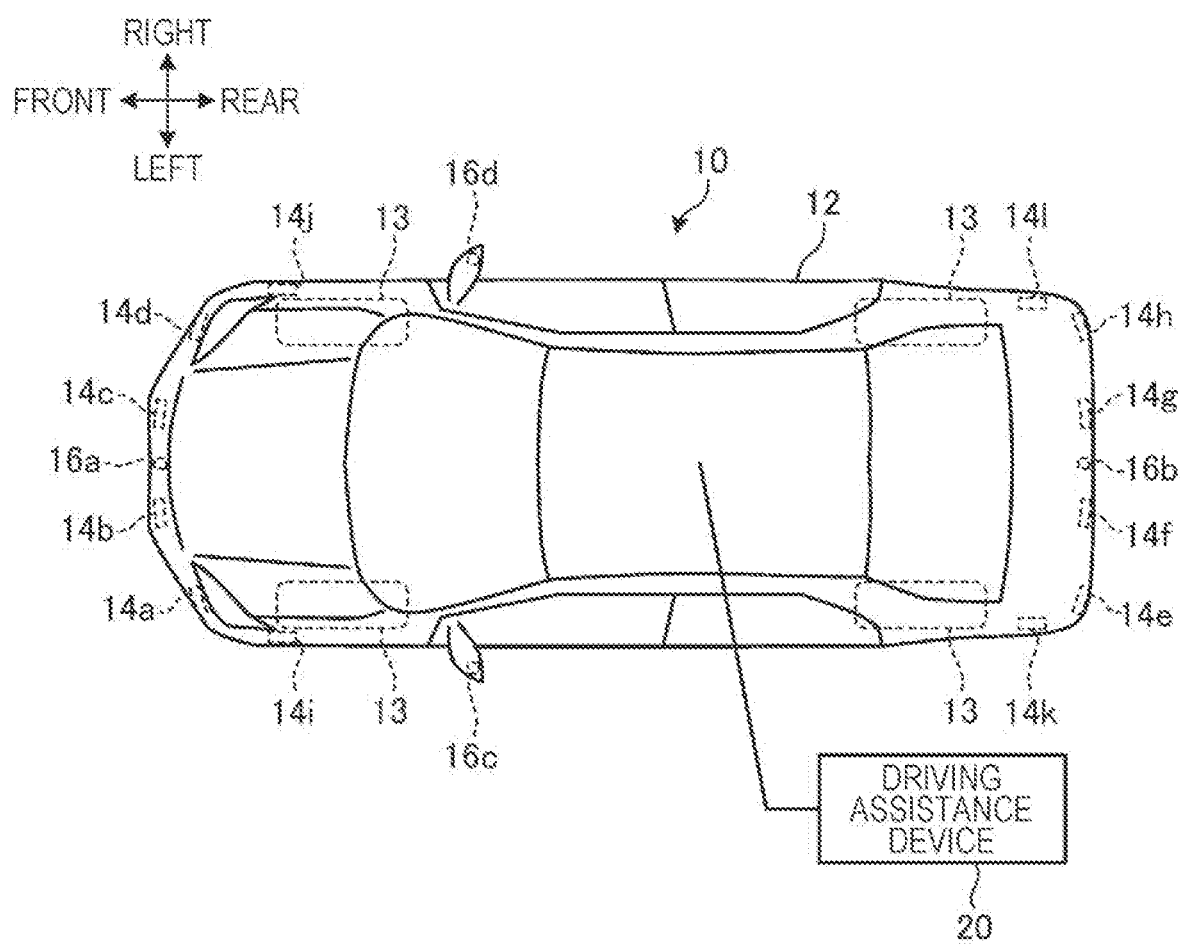
FIG. 1 is a top view of a vehicle on which a driving assistance device according to an embodiment is mounted.

Similar components in the following exemplary embodiments and the like are denoted by the same reference numerals, and redundant description will be omitted as appropriate.

Configuration Example of Vehicle

FIG. 1 is a top view of a vehicle 10 on which a driving assistance device 20 according to an embodiment is mounted. Front, rear, left, and right of the vehicle 10 in FIG. 1 indicate directions as viewed from a driver's seat of the vehicle 10.

The vehicle 10 of the embodiment may be, for example, an internal combustion engine vehicle using an internal combustion engine as a drive source, an electric vehicle, a fuel cell vehicle, or the like using an electric motor as a drive source, or a hybrid vehicle using both of them as drive sources.

In addition, the vehicle 10 can be mounted with various transmission devices, and can be mounted with devices such as various systems and components necessary for driving the internal combustion engine or the electric motor. In addition, the type, number, layout, and the like of devices related to the driving of the wheels 13 in the vehicle 10 can be variously set.

As illustrated in FIG. 1, the vehicle 10 includes a vehicle body 12, a plurality of wheels 13, a plurality of distance measuring units 14*a* to 14*l*, and a plurality of imaging units 16*a* to 16*d*. Note that, in a case where it is not necessary to distinguish the distance measuring units 14*a* to 14*l*, they are simply referred to as the distance measuring unit 14. Furthermore, in a case where it is not necessary to distinguish the imaging units 16*a* to 16*d*, they are simply referred to as the imaging unit 16.

The vehicle body 12 constitutes a vehicle compartment in which an occupant rides. A plurality of wheels 13, a plurality of distance measuring units 14, and a plurality of imaging units 16 are attached to the vehicle body 12. In the example of FIG. 1, the vehicle body 12 includes four wheels 13, 12 distance measuring units 14, and four imaging units 16. However, the number of distance measuring units 14 and imaging units 16 attached to the vehicle body 12 is arbitrary.

The four wheels 13 are provided on the front, rear, left, and right of the vehicle body 12. The two wheels 13 on the front side function as, for example, turning wheels, and the two wheels 13 on the rear side function as, for example, drive wheels.

The distance measuring unit 14 serving as a sensor is, for example, a sonar that is provided on the outer peripheral portion of the vehicle 10, transmits a sound wave such as an ultrasonic wave as a detection wave, and captures the detection wave reflected by an object such as an obstacle present at a periphery of the vehicle 10. Note that the distance measuring unit 14 may be a radar that transmits a detection wave such as laser light, a millimeter wave radar, or the like.

The distance measuring unit 14 collects peripheral information, which is information of the periphery of the vehicle 10, and outputs the peripheral information to the driving assistance device 20. For example, the distance measuring unit 14 collects a response time, which is a time from transmission to reception of the detection wave, as peripheral information for specifying a distance between the object and the vehicle 10. The driving assistance device 20 can detect the presence or absence of an obstacle or the like at the periphery of the vehicle 10 and the distance to the obstacle based on the peripheral information collected by the distance measuring unit 14.

Note that, in a case where the distance measuring unit 14 receives a plurality of detection waves reflected by a plurality of points of the object with respect to one transmission of the detection wave, only the response time of the detection wave received the earliest may be included in the peripheral information.

The distance measuring units 14*a* to 14*d* are provided in a front portion of vehicle body 12. Among these distance measuring units 14*a* to 14*d*, the distance measuring units 14*b* and 14*c* are also called front sonars and are provided at the front end portion of the vehicle 10. The distance measuring units 14*b* and 14*c* detect an object in front of the vehicle 10 and collect peripheral information of the front side of the vehicle 10. In addition, the distance measuring units 14*a* and 14*d* are also called corner sonars, and are provided at corner portions of the front portion of the vehicle 10. The distance measuring units 14*a* and 14*d* detect an object on the front outer side of the vehicle 10 and collect peripheral information of the front outer side of the vehicle 10.

The distance measuring units 14*e* to 14*h* are provided at the rear portion of the vehicle body 12. Among these distance measuring units 14*e* to 14*h*, the distance measuring units 14*f* and 14*g* are also called rear sonars and are provided at the rear end portion of the vehicle 10. The distance measuring units 14*f* and 14*g* detect an object behind the vehicle 10 and collect peripheral information of the rear side of the vehicle 10. In addition, the distance measuring units 14*e* and 14*h* are also called corner sonars, and are provided at corner portions of the rear portion of the vehicle 10. The distance measuring units 14*e* and 14*h* detect an object on the rear outer side of the vehicle 10 and collect peripheral information of the rear outer side of the vehicle 10.

The distance measuring units 14*i* to 14*l* are also called side sonars and are provided at a side portion of the vehicle body 12. Among the distance measuring units 14*i* to 14*l*, the distance measuring units 14*i* and 14*j* are provided on the side of the front portion of the vehicle 10. The distance measuring units 14*k* and 14*l* are provided on the side of the rear portion of the vehicle 10. The distance measuring units 14*i* to 14*l* detect an object on the side of the vehicle 10 and collect peripheral information of the side of the vehicle 10.

The imaging unit 16 serving as a sensor is, for example, a digital camera incorporating an imaging element such as a charge coupled device (CCD) or a CMOS image sensor (CIS). The imaging unit 16 generates an imaged image of a moving image or a still image including a plurality of frame images captured at a predetermined frame rate.

The imaging unit 16 is provided on the outer peripheral portion of the vehicle body 12 and includes a wide-angle lens or a fisheye lens, and for example, can capture a range of 140° to 190° in the horizontal direction. The optical axis of the imaging unit 16 is set obliquely downward.

As a result, imaging unit 16 collects peripheral information obtained by imaging the periphery of vehicle 10 including the road surface, and outputs the peripheral information to the driving assistance device 20. The driving assistance device 20 can detect the presence or absence of an obstacle or the like at the periphery of the vehicle 10 and the position of the obstacle based on the peripheral information collected by the imaging unit 16. Furthermore, the driving assistance device 20 can detect a parking section at the periphery of the vehicle 10 and a position of the parking section based on the peripheral information collected by the imaging unit 16.

The imaging unit 16a is provided at the central part in the left-right direction of the front end portion of the vehicle body 12, for example, at the front bumper. The imaging unit 16a collects an imaged image obtained by imaging the front side of vehicle 10 as the peripheral information. The imaging unit 16b is provided at a central part in the left-right direction of the rear end portion of the vehicle body 12, for example, at the rear bumper. The imaging unit 16b collects an imaged image obtained by imaging the rear side of the vehicle 10 as the peripheral information.

The imaging unit 16c is provided at a central part in the front-rear direction of the left end portion of the vehicle body 12, for example, at a side mirror on the left side. The imaging unit 16c collects an imaged image obtained by imaging the left side of the vehicle 10 as the peripheral information. The imaging unit 16d is provided at a central part in the front-rear direction of the right end portion of the vehicle body 12, for example, at a side mirror on the right side. The imaging unit 16d collects an imaged image obtained by imaging the periphery of the right side of the vehicle 10 as the peripheral information.

Configuration Example of Driving Assistance System

Figure 2:
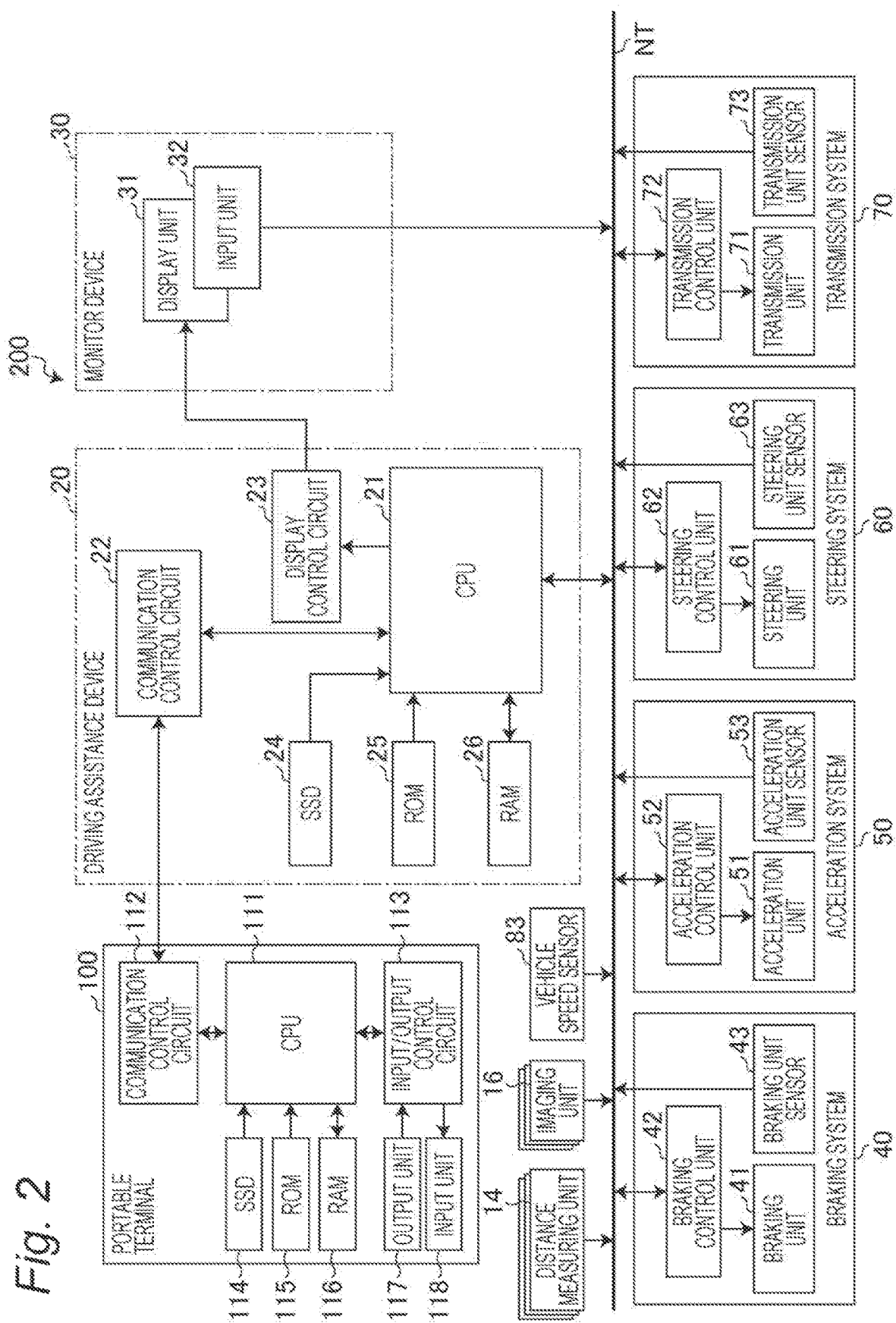
FIG. 2 is a block diagram illustrating an example of an overall configuration of a driving assistance system according to the embodiment.

FIG. 2 is a block diagram illustrating an example of an overall configuration of a driving assistance system 200 according to the embodiment. The driving assistance system 200 is mounted on the vehicle 10, for example, and remotely performs driving assistance such as entering into a parking section or exiting from the parking section of the vehicle 10 in a state where the driver has got off from the vehicle 10.

As illustrated in FIG. 2, the driving assistance system 200 includes a driving assistance device 20, a monitor device 30, a braking system 40, an acceleration system 50, a steering system 60, a transmission system 70, a vehicle speed sensor 83, a distance measuring unit 14, and an imaging unit 16. These configurations are connected by an in-vehicle network NT so as to be able to transmit and receive information to and from each other.

The in-vehicle network NT is configured to include, for example, a controller area network (CAN), a local interconnect network (LIN), and the like. The in-vehicle network NT may be included in a part of the driving assistance system 200.

In addition, the driving assistance system 200 is connected to a portable terminal 100 possessed by a user such as a driver of the vehicle 10 so as to be able to transmit and receive information to and from each other via a wireless line such as the Internet.

The driving assistance device 20 is configured as a microcomputer such as an electronic control unit (ECU), and provides driving assistance of the vehicle 10.

The driving assistance device 20 includes a central processing unit (CPU) 21, a communication control circuit 22, a display control circuit 23, a solid state drive (SSD) 24, a read only memory (ROM) 25, and a random access memory (RAM) 26. The CPU 21, the ROM 25, and the RAM 26 may be integrated in the same package.

The CPU 21 is an example of a hardware processor, reads a program stored in a nonvolatile storage device such as the ROM 25, and executes various arithmetic processing and control according to the program.

The ROM 25 stores various programs, parameters necessary for executing the programs, and the like. The RAM 26 temporarily stores various data used in the calculation by the CPU 21. The SSD 24 is a rewritable nonvolatile storage device, and maintains data even when the power of the driving assistance device 20 is turned off.

The communication control circuit 22 mainly executes processing related to transmission and reception of information to and from the portable terminal 100 of the arithmetic processing performed by the driving assistance device 20. Among the arithmetic processing performed by the driving assistance device 20, the display control circuit 23 mainly executes image processing of an image obtained by the imaging unit 16, data conversion of an image for display to be displayed on a display unit 31 (to be described later) included in the monitor device 30, and the like.

The braking system 40 includes a braking unit 41, a braking control unit 42, and a braking unit sensor 43, and controls deceleration of the vehicle 10.

The braking unit 41 is a device including, for example, a brake, a brake pedal, and the like, and decelerates the vehicle 10. The braking control unit 42 is, for example, a microcomputer having a hardware processor such as a CPU. The braking control unit 42 controls the braking unit 41 based on an instruction from the driving assistance device 20 to control deceleration of the vehicle 10. The braking unit sensor 43 is, for example, a position sensor, and detects a position of a brake pedal included in the braking unit 41. The braking unit sensor 43 outputs the detected brake pedal position to the in-vehicle network NT.

The acceleration system 50 includes an acceleration unit 51, an acceleration control unit 52, and an acceleration unit sensor 53, and controls acceleration of the vehicle 10.

The acceleration unit 51 is a device including, for example, an accelerator pedal, and accelerates the vehicle 10. The acceleration control unit 52 is, for example, a microcomputer including a hardware processor such as a CPU. The acceleration control unit 52 controls the acceleration unit 51 based on an instruction from the driving assistance device 20 to control the acceleration of the vehicle 10. The acceleration unit sensor 53 is, for example, a position sensor, and detects a position of an accelerator pedal included in the acceleration unit 51. The acceleration unit sensor 53 outputs the detected accelerator pedal position to the in-vehicle network NT.

The steering system 60 includes a steering unit 61, a steering control unit 62, and a steering unit sensor 63, and controls the advancing direction of the vehicle 10.

The steering unit 61 is a device including, for example, a wheel, a steering wheel, or the like, and steers the advancing direction of the vehicle 10 by turning the turning wheel of the vehicle 10. The steering control unit 62 is, for example, a microcomputer including a hardware processor such as a CPU. The steering control unit 62 controls the steering unit 61 based on an instruction from the driving assistance device 20 to control the advancing direction of the vehicle 10. The steering unit sensor 63 is an angle sensor including, for example, a Hall element and the like, and detects a steering angle which is a rotation angle of the steering unit 61. The steering unit sensor 63 outputs the detected steering angle of the steering unit 61 to the in-vehicle network NT.

The transmission system 70 includes a transmission unit 71, a transmission control unit 72, and a transmission unit sensor 73, and controls a transmission ratio of the vehicle 10.

The transmission unit 71 is, for example, a device including a shift lever and the like, and changes the transmission ratio of the vehicle 10. The transmission control unit 72 is, for example, a microcomputer including a hardware processor such as a CPU. The transmission control unit 72 controls the transmission unit 71 based on an instruction from the driving assistance device 20 to control the transmission ratio of the vehicle 10. The transmission unit sensor 73 is, for example, a position sensor, and detects a position of a shift lever included in the transmission unit 71. The transmission unit sensor 73 outputs the detected shift lever position to the in-vehicle network NT.

The vehicle speed sensor 83 includes, for example, a Hall element provided in the vicinity of the wheel 13 of the vehicle 10, and detects the rotation amount of the wheel 13 or the rotation number per unit time. The vehicle speed sensor 83 outputs the wheel speed pulse number indicating the detected rotation amount or rotation number to the in-vehicle network NT as a sensor value for calculating the speed (vehicle speed) of the vehicle 10. The driving assistance device 20 can calculate the speed, the movement amount, and the like of the vehicle 10 based on the sensor value acquired from the vehicle speed sensor 83.

The monitor device 30 is provided on a dashboard or the like in the vehicle compartment of the vehicle 10, and includes a display unit 31 and an input unit 32.

The display unit 31 is a display device such as, for example, a liquid crystal display (LCD) or an organic electroluminescent (EL) display (OELD). The display unit 31 displays, for example, an image based on image data transmitted from the driving assistance device 20, an image for receiving an operation instruction for instructing switching between automatic driving and manual driving, and the like.

The input unit 32 is, for example, a touch panel provided on a display screen of the display unit 31. The input unit 32 is configured to transmit the contents displayed on the display screen by the display unit 31. Accordingly, the input unit 32 allows the occupant to visually recognize the display content of the display unit 31.

The input unit 32 receives an instruction input by the occupant touching a position corresponding to the display content of the display unit 31, and transmits the instruction to the driving assistance device 20 via the in-vehicle network NT. Note that the input unit 32 is not limited to the touch panel, and may be a push-button hard switch or the like.

The portable terminal 100 is a computer including a CPU 111, a communication control circuit 112, an input/output control circuit 113, an SSD 114, a ROM 115, and a RAM 116. In addition, the portable terminal 100 includes an output unit 117 and an input unit 118. The portable terminal 100 is possessed by a user such as a driver of the vehicle 10 and is configured so as to be carried by the user. As an example, the portable terminal 100 may be a smartphone, a portable phone, a tablet terminal, or the like.

The CPU 111 is an example of a hardware processor, reads a program stored in a nonvolatile storage device such as the ROM 115, and executes various arithmetic processing and control according to the program.

The ROM 115 stores various programs, parameters necessary for executing the programs, and the like. The RAM 116 temporarily stores various data used in the calculation by the CPU 11. The SSD 114 is a rewritable nonvolatile storage device, and maintains data even when the power of the portable terminal 100 is turned off.

The communication control circuit 112 mainly executes processing related to transmission and reception of information to and from the driving assistance device 20 of the arithmetic processing performed by the portable terminal 100. The input/output control circuit 113 causes the output unit 117 to output information, notification, and the like regarding driving assistance from the driving assistance device 20 received by the communication control circuit 112. In addition, the input/output control circuit 113 receives operation content input from the input unit 118, and causes the operation content to be transmitted from the communication control circuit 112 to the driving assistance device 20.

The output unit 117 is, for example, a display device such as a liquid crystal display or an organic EL display. The output unit 117 displays, for example, an image based on image data transmitted by the driving assistance device 20, an image for receiving an operation instruction regarding driving assistance, and the like. The output unit 117 may include a speaker or the like capable of outputting a voice, an alarm, or the like.

The input unit 118 is, for example, a touch panel or the like provided in the output unit 117 which is a display device or the like. The input unit 118 receives an instruction input by the user touching a position corresponding to the display content of the display device. Note that the input unit 118 may include a push-button hard switch such as a keyboard, or the like.

Figure 3:
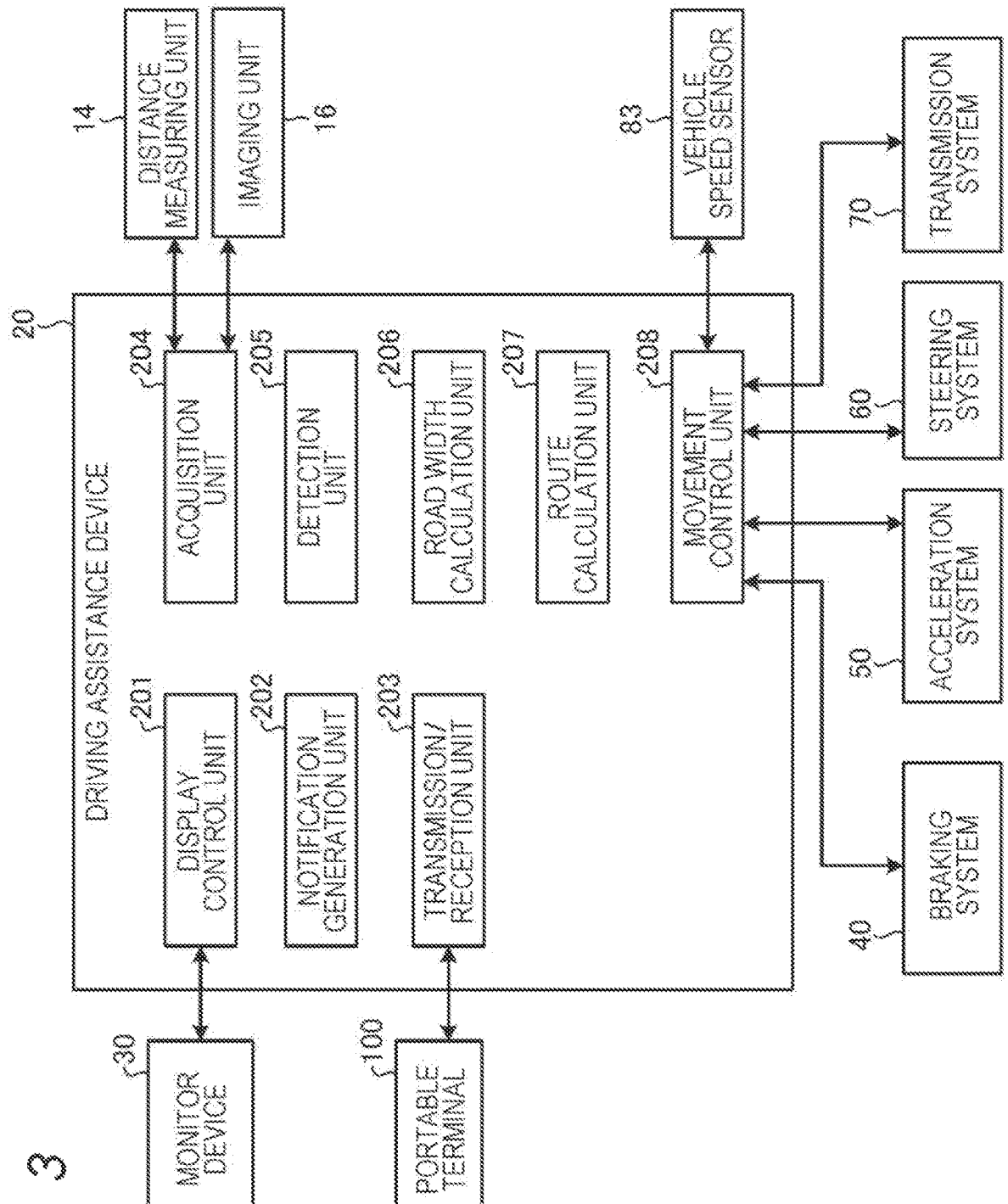
FIG. 3 is a block diagram illustrating an example of a functional configuration of the driving assistance device according to the embodiment.

FIG. 3 is a block diagram illustrating an example of a functional configuration of the driving assistance device 20 according to the embodiment. As illustrated in FIG. 3, the driving assistance device 20 includes a display control unit 201, a notification generation unit 202, a transmission/reception unit 203, an acquisition unit 204, a detection unit 205, a road width calculation unit 206, a route calculation unit 207, and a movement control unit 208 as functional units.

These functional units are implemented, for example, by the above-described CPU 21 reading a program stored in a storage device such as the ROM 25 and executing the program. Alternatively, under the control of the CPU 21 according to the program, the communication control circuit 22, the display control circuit 23, the SSD 24, and the like operate to realize the above.

Some or all of these functional units may be configured by hardware such as a circuit including an application specific integrated circuit (ASIC).

The display control unit 201 generates contents to be displayed on the display unit 31 of the monitor device 30 and displays the contents on the display unit 31. That is, the display control unit 201 causes the display unit 31 to display, for example, a notification screen indicating that a parking area where the vehicle 10 can be parked has been detected, a selection screen for starting, interrupting, or canceling the driving assistance, a peripheral image of the vehicle 10 receiving driving assistance, and the like.

The notification generation unit 202 generates a notification related to driving assistance to be transmitted to the portable terminal 100. That is, the notification generation unit 202 generates notification contents to the user such as start, interruption, or stop of driving assistance.

The transmission/reception unit 203 transmits and receives information to and from the portable terminal 100. That is, for example, the transmission/reception unit 203 receives the positional information of the portable terminal 100 from the portable terminal 100. The positional information of the portable terminal 100 is information indicating the location of the portable terminal 100, for example, a radio wave emitted by the portable terminal 100 or an operation signal of the portable terminal 100 by the user. Furthermore, the transmission/reception unit 203 transmits the notification generated by the notification generation unit 202 to the portable terminal 100. Moreover, the transmission/reception unit 203 receives an operation instruction or the like of the user with respect to the transmitted notification from the portable terminal 100.

The acquisition unit 204 acquires, as peripheral information of the vehicle 10, transmission/reception wave information of a sound wave from the distance measuring unit 14 and an imaged image of the periphery of the vehicle 10 from the imaging unit 16.

The detection unit 205 detects an obstacle, a parking section, a parking area, and the like at the periphery of the vehicle 10 based on the peripheral information acquired by the acquisition unit 204.

The obstacle is, for example, various objects such as another vehicle, a wall, a pillar, a fence, a protrusion, a step, and a wheel stopper. Furthermore, the obstacle may be, for example, a person walking through a parking lot, a driver who got off from the vehicle 10 during the driving assistance, or the like.

The parking section is provided so as to park the vehicle 10, and is an area divided by, for example, a dividing line, a frame line, a straight line, a band, a step, or the like. The parking area is a parking section where the vehicle 10 can be parked, that is, a parking section where there is no obstacle such as another vehicle that becomes an obstacle in the parking of the vehicle 10. In the exiting assistance of the vehicle 10, a parking section in which the vehicle 10 is parked may be referred to as a parking area.

The detection unit 205 detects the presence or absence of an obstacle, the distance from the vehicle 10 to the obstacle, and the like, for example, based on the detection result of the distance measuring unit 14. Furthermore, the detection unit 205 detects, for example, the presence or absence of an obstacle, a parking section, positions (orientations) of the parking section with respect to the vehicle 10, and shapes, sizes, heights, and the like thereof by image processing based on an image imaged by the imaging unit 16.

By combining these detection results, the detection unit 205 extracts information such as whether or not there is an obstacle at the periphery of the vehicle 10, whether or not the obstacle affects the traveling of the vehicle 10, whether or not there is a parking section at a periphery of the vehicle 10, whether or not the vehicle 10 can be parked in a parking section, that is, whether or not it can be used as the parking area, or the like.

The road width calculation unit 206 calculates a road width in which the vehicle 10 can move in the driving assistance. More specifically, the road width calculation unit 206 calculates a boundary line extending in a predetermined direction on the parking area side detected by the detection unit 205. The road width calculation unit 206 calculates another boundary line extending in the same direction as the above-described boundary line on the side facing the parking area. The road width calculation unit 206 sets a region sandwiched between these boundary lines as a road width.

The road width calculation unit 206 recalculates the road width when a new obstacle is detected by the detection unit 205 even after the start of the driving assistance. More specifically, when a new obstacle is detected at a predetermined position within the two boundary lines, the road width calculation unit 206 recalculates the boundary line on the side facing the parking area at a predetermined timing based on the new obstacle, and updates the road width accordingly.

The route calculation unit 207 calculates a target position for guiding the vehicle 10 based on the detection result by the detection unit 205, and calculates a movement route for moving the vehicle 10 to the target position.

In a case where the vehicle 10 is to be parked (entered), the parking area detected by the detection unit 205 becomes the target position. In a case where the vehicle 10 is to exit from the parking section, a predetermined place where the vehicle 10 can safely start traveling thereafter, such as on a passage provided between the plurality of parking sections, becomes the target position.

In addition, the route calculation unit 207 may calculate the steering wheel turn-back position as necessary. One or more steering wheel turn-back positions are set in a case where parking or exiting is difficult by one backward movement or forward movement.

The route calculation unit 207 calculates a movement route of the vehicle 10 from the current position of the vehicle 10 to the target position in order to guide the vehicle 10 to the target position calculated as described above. The departure position of the vehicle 10 is the position of the vehicle 10 at the time point when driving assistance is selected by the driver or the like. The movement route may include the steering wheel turn-back position as described above. In this case, the route calculation unit 207 calculates a movement route from the departure position of the vehicle 10 to the target position through the steering wheel turn-back position.

Here, the route calculation unit 207 calculates the movement route so as to pass through the parking area detected by the detection unit 205 and the area within the two boundary lines calculated by the road width calculation unit 206. That is, when calculating the movement route, the route calculation unit 207 prevents the movement route from deviating from the parking area and the area within the two boundary lines.

The route calculation unit 207 calculates a movement route for parking, for example, backward parking, forward parking, parallel parking by backward movement, parallel parking by forward movement, or the like. In addition, the route calculation unit 207 calculates a movement route for exiting, for example, forward exiting, backward exiting, parallel exiting by forward movement, parallel exiting by backward movement, or the like.

The movement control unit 208 controls each unit of the vehicle 10 to move the vehicle 10 when the driving assistance of the vehicle 10. Specifically, the movement control unit 208 controls all or part of the braking system 40, the acceleration system 50, the steering system 60, and the transmission system 70 to move the vehicle 10 to the target position according to the movement route. At this time, the movement control unit 208 moves the vehicle 10 while receiving feedback from each of the sensors such as the braking unit sensor 43, the acceleration unit sensor 53, the steering unit sensor 63, the transmission unit sensor 73, and the vehicle speed sensor 83.

Example of Road Width Calculation of Driving Assistance Device

Next, a function of calculating the road width 300 by the road width calculation unit 206 of the driving assistance device 20 will be described with reference to FIG. 4.

Figure 4:
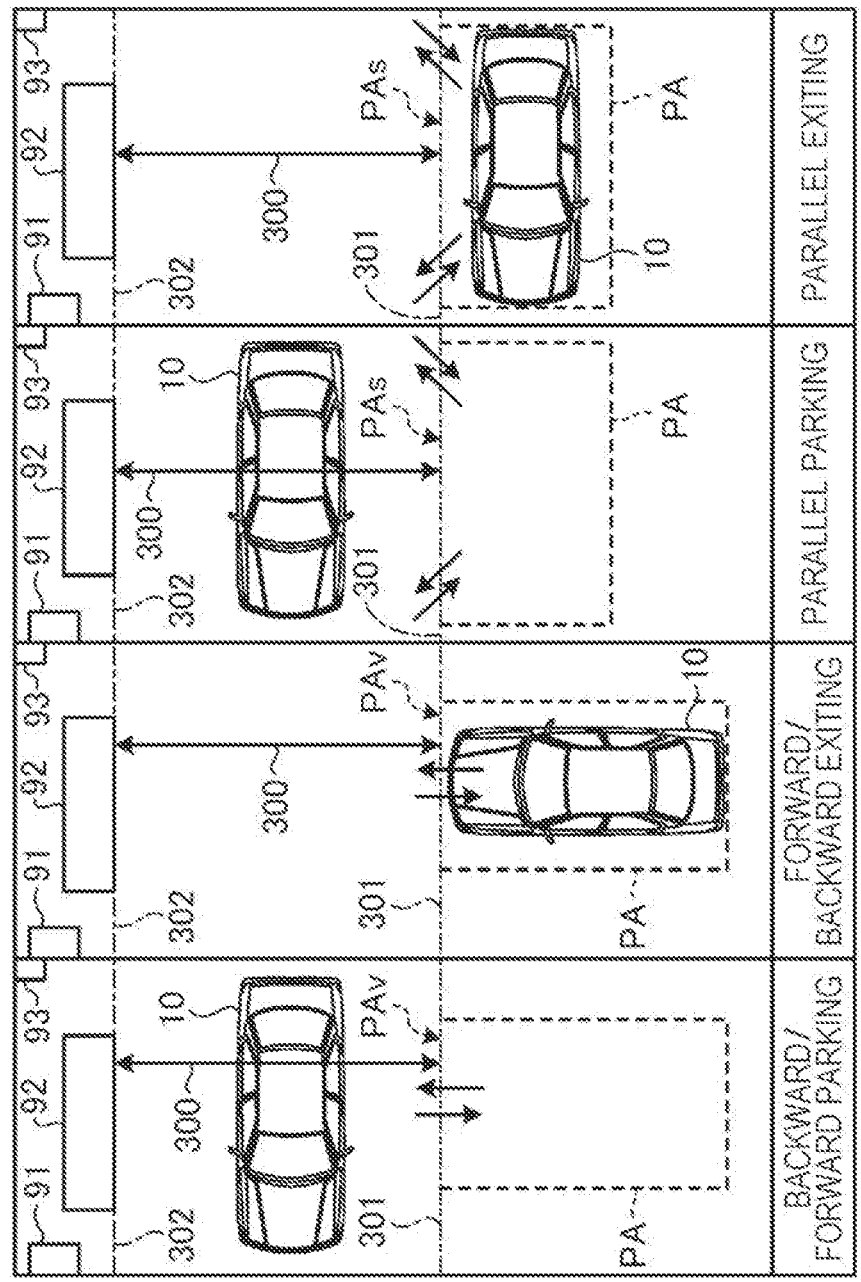
FIG. 4 is a schematic diagram describing some examples for a case where the driving assistance device according to the embodiment calculates a road width.

FIG. 4 is a schematic diagram describing some examples for a case where the driving assistance device 20 according to the embodiment calculates a road width 300. FIG. 4 illustrates an example in which the road width calculation unit 206 calculates the road width 300 in each of the backward/forward parking, the forward/backward exiting, the parallel parking, and the parallel exiting.

As illustrated in FIG. 4, when driving assistance is started, the detection unit 205 of the driving assistance device 20 acquires peripheral information of the vehicle 10 from distance measuring unit 14 and the imaging unit 16, and selects a parking area PA from the detected parking section. In the parking assistance, the detection unit 205 detects, for example, a vacant parking section or the like as a parking area PA where the vehicle 10 can be parked. In the exiting assistance, the detection unit 205 detects, for example, a parking section where the vehicle 10 is parked at that time as the parking area PA.

In the example of FIG. 4, a plurality of obstacles 91 to 93 are detected on the opposite side of the parking area PA with the vehicle 10 in between. When the parking area PA is facing a road or the like, these obstacles 91 to 93 are some kind of object or the like constituting one end side of the road, such as a wall of a building, an electric pole, or a curbstone facing the parking area PA with the road in between. When the parking area PA is in a parking lot or the like, these obstacles 91 to 93 may be other parked vehicles, wheel stops, or the like in a parking section installed on the opposite side of the detected parking area PA with a passage in between.

In the driving assistance for backward/forward parking the vehicle 10, the vehicle 10 is initially stopped, for example, on the outside of the parking area PA and in the vicinity of the end portion PAv of the parking area PA on the entrance side. The end portion PAv of the parking area PA on the entrance side is an end portion on the side on which the vehicle 10 enters and exits when parking or exiting the parking area PA as indicated by an arrow pointing in the up-down direction in the drawing.

The direction of the vehicle 10 at this time is substantially orthogonal to the depth of the parking area PA, that is, the parking direction. With such a position as a departure position, the vehicle 10 can be advanced into the parking area PA from the end portion PAv of the parking area PA on the entrance side by backward movement or forward movement, and parked along the depth direction of the parking area PA.

In the driving assistance for forward/backward exiting the vehicle 10, the vehicle 10 is initially parked, for example, in the parking area PA. At this time, the vehicle 10 has the front end portion or the rear end portion facing the end portion PAv of the parking area PA on the entrance side. With such a position as a departure position, the vehicle 10 can be moved to the outside of the parking area PA through the end portion PAv of the parking area PA on the entrance side by forward movement or backward movement, and exit from the parking area PA.

If the driving assistance is started when backward/forward parking or forward/backward exiting the vehicle 10, the road width calculation unit 206 calculates a boundary line 301 as a first boundary line that includes the end portion PAv of the parking area PA on the entrance side detected by the detection unit 205 and extends parallel to the end portion PAv of the parking area PA.

Furthermore, the road width calculation unit 206 calculates a boundary line 302 as a second boundary line that includes an end portion on the vehicle 10 side of the obstacles 91 to 93 facing the end portion PAv of the parking area PA on the entrance side and extends parallel to the end portion PAv of the parking area PA. That is, the boundary line 302 extends parallel to the boundary line 301 on the parking area side.

As in the example of FIG. 4, when there are a plurality of obstacles 91 to 93 facing the end portion PAv of the parking area PA on the entrance side, the boundary line 302 is calculated to include the end portion on the vehicle 10 side of the obstacle 92 serving as the first obstacle, which is the closest obstacle to the vehicle 10.

In addition, the road width calculation unit 206 sets an area sandwiched between these boundary lines 301, 302 as a road width 300 in which the vehicle 10 receiving driving assistance can move. As described above, the route calculation unit 207 calculates the movement route of the vehicle 10 so as not to go out of the area sandwiched by the boundary line 301, 302 and the parking area PA. As a result, the movement route can be set by effectively utilizing the road width 300 while avoiding the obstacles 91 to 93.

When parallel parking the vehicle 10 by backward movement, the end portion of the parking area PA on the entrance side is an end portion PAs with an arrow pointing obliquely upward to the left and obliquely downward to the right in the drawing. When parallel parking the vehicle 10 by forward movement, the end portion of the parking area PA on the entrance side is an end portion PAs with an arrow pointing obliquely upward to the right and obliquely downward to the left in the drawing, and is an end portion on the same side as in the case of parallel parking by backward movement.

In the driving assistance for parallel parking the vehicle 10 by forward movement or backward movement, the vehicle 10 is initially stopped, for example, on the outside of the parking area PA and in the vicinity of the end portion PAs of the parking area PA on the entrance side. The direction of the vehicle 10 at this time is substantially parallel to the depth of the parking area PA, that is, the parking direction.

With such a position as a departure position, the vehicle 10 can be advanced obliquely into the parking area PA from one side in the depth direction of the end portion PAs of the parking area PA on the entrance side by backward movement or forward movement, and parked along the depth direction of the parking area PA.

When parallel exiting the vehicle 10 by forward movement or backward movement, and when parallel exiting the vehicle 10 by backward movement, the end portion PAs of the parking area PA on the entrance side is the end portion on the same side as in the case of parallel parking.

In the driving assistance for parallel exiting the vehicle 10 by forward movement or backward movement, the vehicle 10 is parked in the parking area PA with the front end portion facing one side and the rear end portion facing the other side in the depth direction of the end portion PAs of the parking area PA on the entrance side.

With such a position as a departure position, the vehicle 10 can be moved obliquely to outside the parking area PA from one side in the depth direction of the end portion PAs of the parking area PA on the entrance side by backward movement or forward movement, and exit from the parking area PA.

If the driving assistance is started when parallel parking or parallel exiting the vehicle 10, the road width calculation unit 206 calculates a boundary line 301 as a first boundary line that includes the end portion PAs of the parking area PA on the entrance side and extends parallel to the end portion PAs of the parking area PA.

Furthermore, the road width calculation unit 206 calculates a boundary line 302 as a second boundary line that includes an end portion on the vehicle 10 side of the obstacle 92 closest to the vehicle 10 among the obstacles 91 to 93 facing the end portion PAs of the parking area PA on the entrance side and extends in a direction parallel to the end portion PAs of the parking area PA on the entrance side and the boundary line 301.

In addition, the road width calculation unit 206 sets an area sandwiched between these boundary lines 301, 302 as a road width 300 in which the vehicle 10 receiving driving assistance can move.

In this manner, the road width calculation unit 206 appropriately calculates the boundary lines 301, 302 and the road width 300 in any case of backward/forward parking, forward/backward exiting, parallel parking by backward movement or forward movement, and parallel exiting by forward movement or backward movement. As described above, the boundary line 302 calculated at the start of driving assistance can be updated as appropriate by detection of a new obstacle.

Operation Example of Driving Assistance Device

Next, an operation example of the driving assistance device 20 that performs driving assistance of the vehicle 10 will be described with reference to FIGS. 5 to 11. FIGS. 5 to 9 are schematic diagrams describing an example of an operation of parking assistance by the driving assistance device 20 according to the embodiment.

Figure 5:
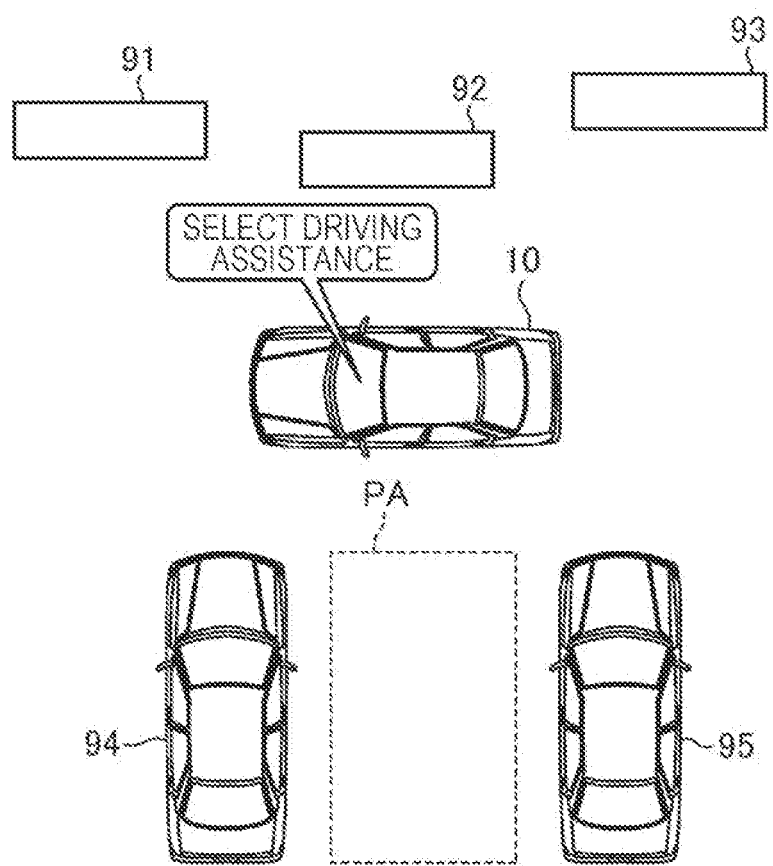
FIG. 5 is a schematic diagram describing an example of an operation of parking assistance by the driving assistance device according to the embodiment.

As illustrated in FIG. 5, it is assumed that one parking section, which is sandwiched between parking sections in which other vehicles 94 and 95 are parked, is vacant in a parking lot or the like in which a plurality of parking sections are arranged. In addition, it is assumed that a plurality of obstacles 91 to 93 exist on the opposite side with respect to the parking section with the vehicle 10 in between.

The detection unit 205 of the driving assistance device 20 mounted on the vehicle 10 detects a plurality of obstacles 91 to 93. The detection unit 205 detects, for example, a vacant parking section among the plurality of parking sections as a parking area PA where the vehicle 10 can be parked. The display control unit 201 of the driving assistance device 20 causes the display unit 31 of the monitor device 30 to display a selection screen for allowing the driver or the like to select whether or not to start driving assistance.

Figure 6:
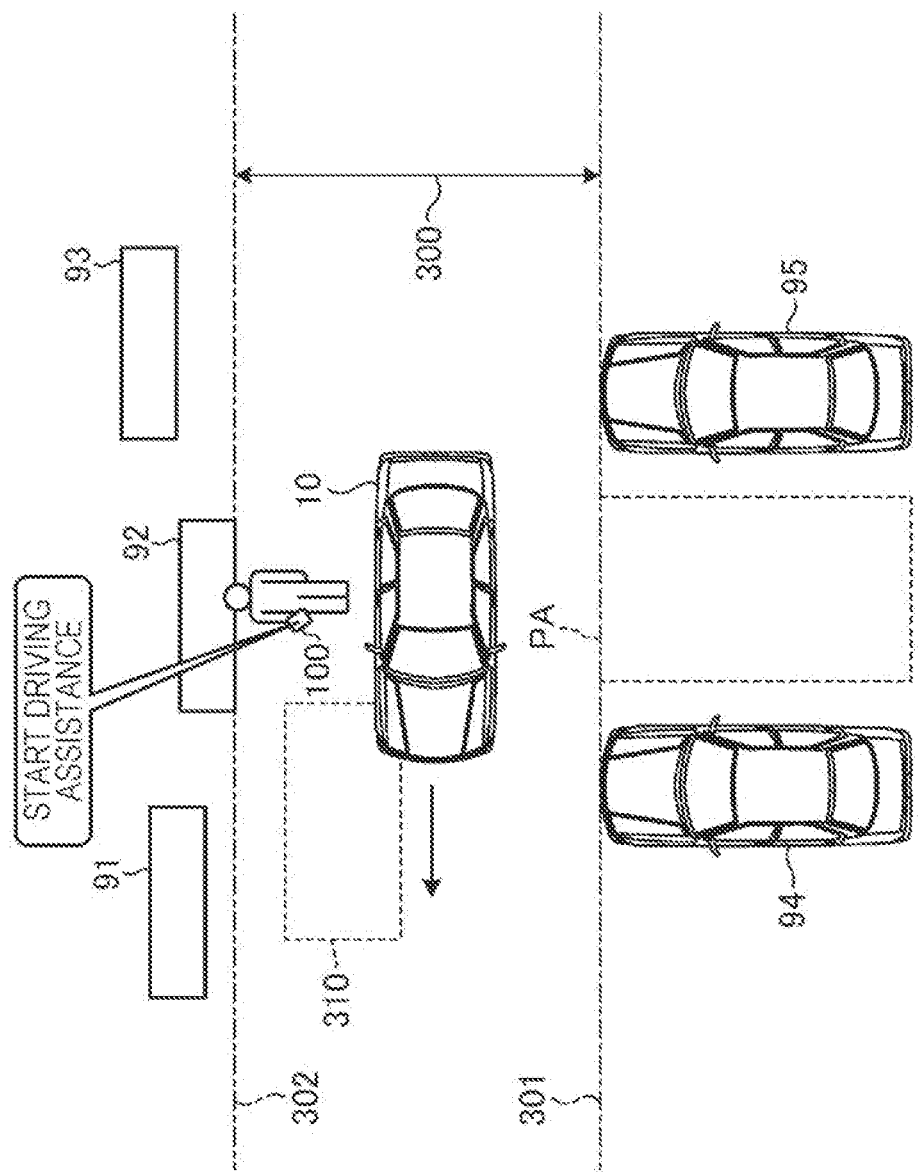
FIG. 6 is a schematic diagram describing an example of an operation of parking assistance by the driving assistance device according to the embodiment.

As illustrated in FIG. 6, it is assumed that the driver got off the vehicle 10 carrying the portable terminal 100 after selecting the start of driving assistance on the monitor device 30.

The transmission/reception unit 203 of the driving assistance device 20 receives positional information such as a radio wave or an operation signal transmitted from the portable terminal 100, and detects that the portable terminal 100 has moved to the outside of the vehicle 10. The driving assistance device 20 starts driving assistance when detected that the portable terminal 100 has moved to the outside of the vehicle 10 after the driver selects the start of driving assistance.

At this time, the notification generation unit 202 may generate a notification such as "driving assistance start", and the transmission/reception unit 203 may transmit the notification to the portable terminal 100 and cause the display device of the portable terminal 100 to display the notification.

The road width calculation unit 206 of the driving assistance device 20 calculates the boundary lines 301, 302 and the road width 300, for example, similarly to the backward parking in FIG. 4 described above. Furthermore, the road width calculation unit 206 sets a predetermined area at the periphery of the vehicle 10 as a detection area 310.

The detection area 310 is set on the boundary line 302 side with respect to the vehicle 10 in the advancing direction of the vehicle 10, and serves as a criterion for the road width calculation unit 206 to determine whether or not to update the boundary line 302 and the road width 300 when a new obstacle is detected in the detection area 310 during the driving assistance.

Figure 7:
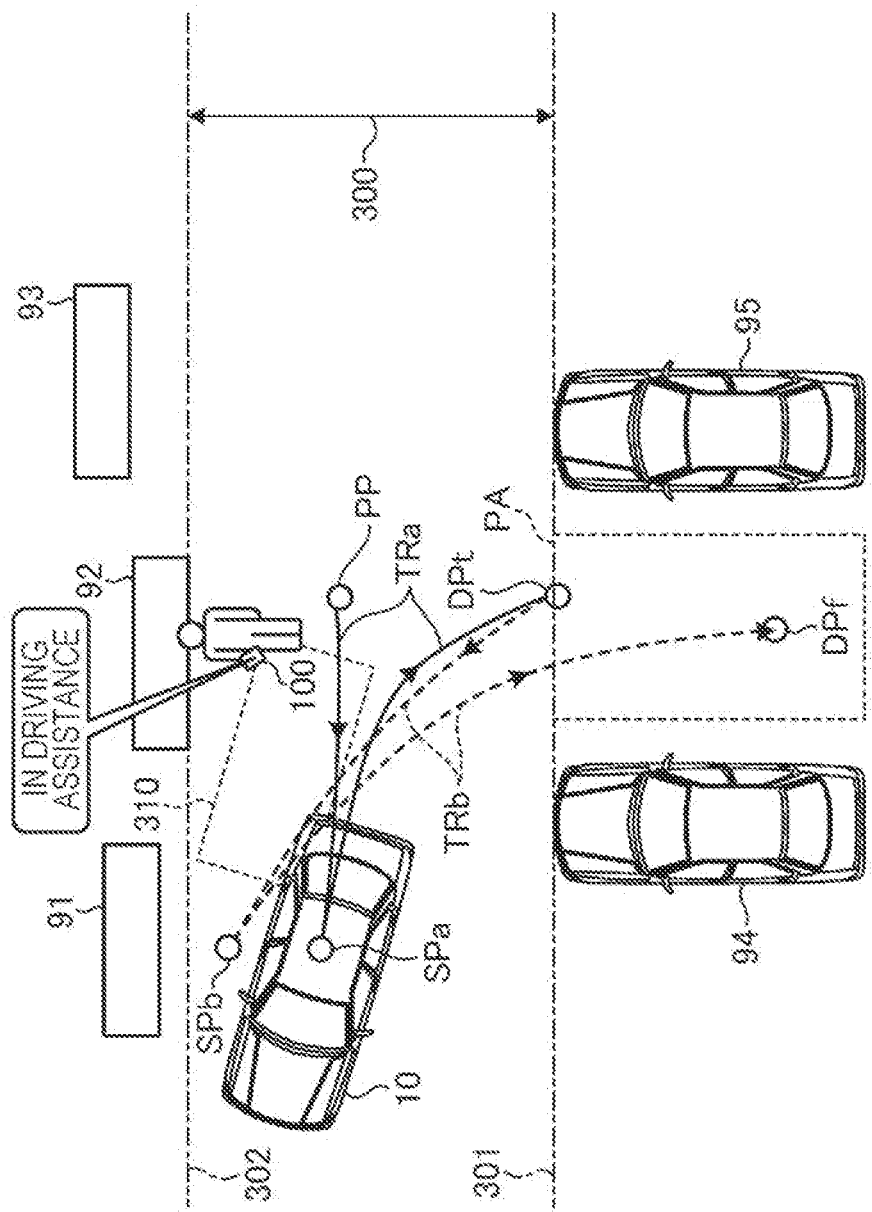
FIG. 7 is a schematic diagram describing an example of an operation of parking assistance by the driving assistance device according to the embodiment.

As illustrated in FIG. 7, the route calculation unit 207 of the driving assistance device 20 calculates a movement route TR from the current position of the vehicle 10 to the parking area PA. In the example of FIG. 7, the movement routes TRa and TRb including two steering wheel turn-backs are calculated.

The movement route TRa is a route indicated by a solid line in the drawing from the departure position PP, which is the current position of the vehicle 10, to the temporary position DPt, which is the backward direction of the vehicle 10 that has reached the steering wheel turn-back position SPa, through the first steering wheel turn-back position SPa in the advancing direction of the vehicle 10. The movement route TRb is a route indicated by a broken line in the drawing from the temporary position DPt to a target position DPf located in the parking area PA in the backward direction of the vehicle 10 that has reached the steering wheel turn-back position SPb through the second steering wheel turn-back position SPb in the advancing direction of the vehicle 10.

The route calculation unit 207 calculates the movement routes TRa and TRb so that the entire movement routes TRa and TRb including the steering wheel turn-back positions SPa and SPb, the temporary position DPt, and the target position DPf fall within the area between the boundary lines 301, 302 and the parking area PA.

The movement control unit 208 of the driving assistance device 20 moves the vehicle 10 on the movement routes TRa, TRb according to the calculation result of the route calculation unit 207. At this time, the notification generation unit 202 may generate a notification such as "in driving assistance" indicating that the vehicle 10 is currently receiving driving assistance, and the transmission/reception unit 203 may transmit the notification to the portable terminal 100 and cause the display device of the portable terminal 100 to display the notification.

FIG. 7 illustrates a state in which the vehicle 10 moves forward on the movement route TRa, moves from the departure position PP to the first steering wheel turn-back position SPa, and further moves backward on the movement route TRa toward the temporary position DPt. Therefore, the road width calculation unit 206 moves the position of the detection area 310 set on the boundary line 302 side in front of the vehicle 10 to the boundary line 302 side with respect to the vehicle 10 in the advancing direction of the vehicle 10, which is behind the vehicle 10 in the new advancing direction of the vehicle 10.

As a result, in the example of FIG. 7, it is assumed that the driver who has got off the vehicle 10 is detected as an obstacle in the detection area 310.

Figure 8:
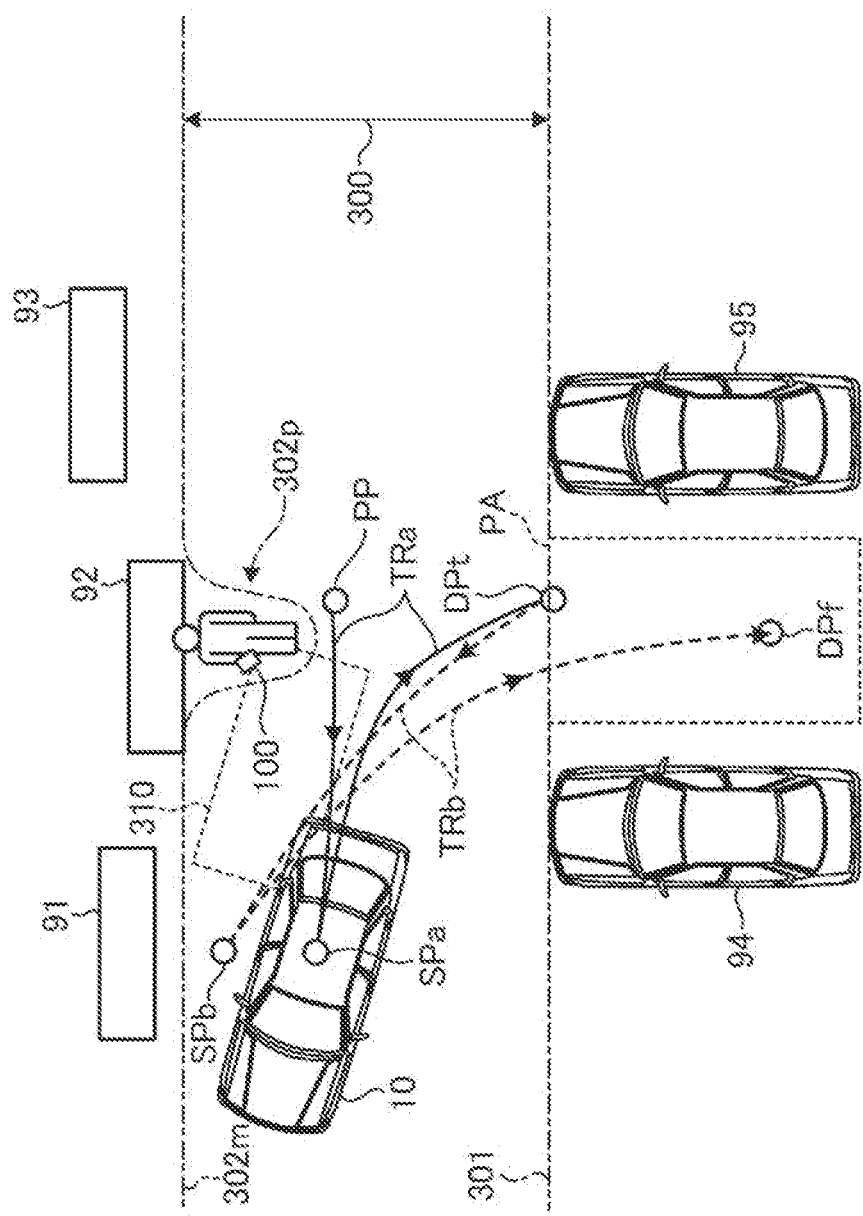
FIG. 8 is a schematic diagram describing an example of an operation of parking assistance by the driving assistance device according to the embodiment.

As illustrated in FIG. 8, when the detection unit 205 detects an obstacle as the second obstacle in the detection region 310, the road width calculation unit 206 sets a boundary line 302m having a projection 302p that projects a part of the boundary line 302 in the vicinity of the obstacle toward the obstacle side and takes it into the boundary line 302 side. As a result, obstacles in the area sandwiched by the boundary lines 301, 320 are excluded to the area outside the boundary line 302m.

In the example of FIG. 8, among the initially calculated movement routes TRa and TRb, the movement routes TRa and TRb along which the vehicle 10 is to move are within the newly set boundary lines 301, 302m. Therefore, the movement control unit 208 continues the movement of the vehicle 10 on the movement route TRa.

Figure 9:
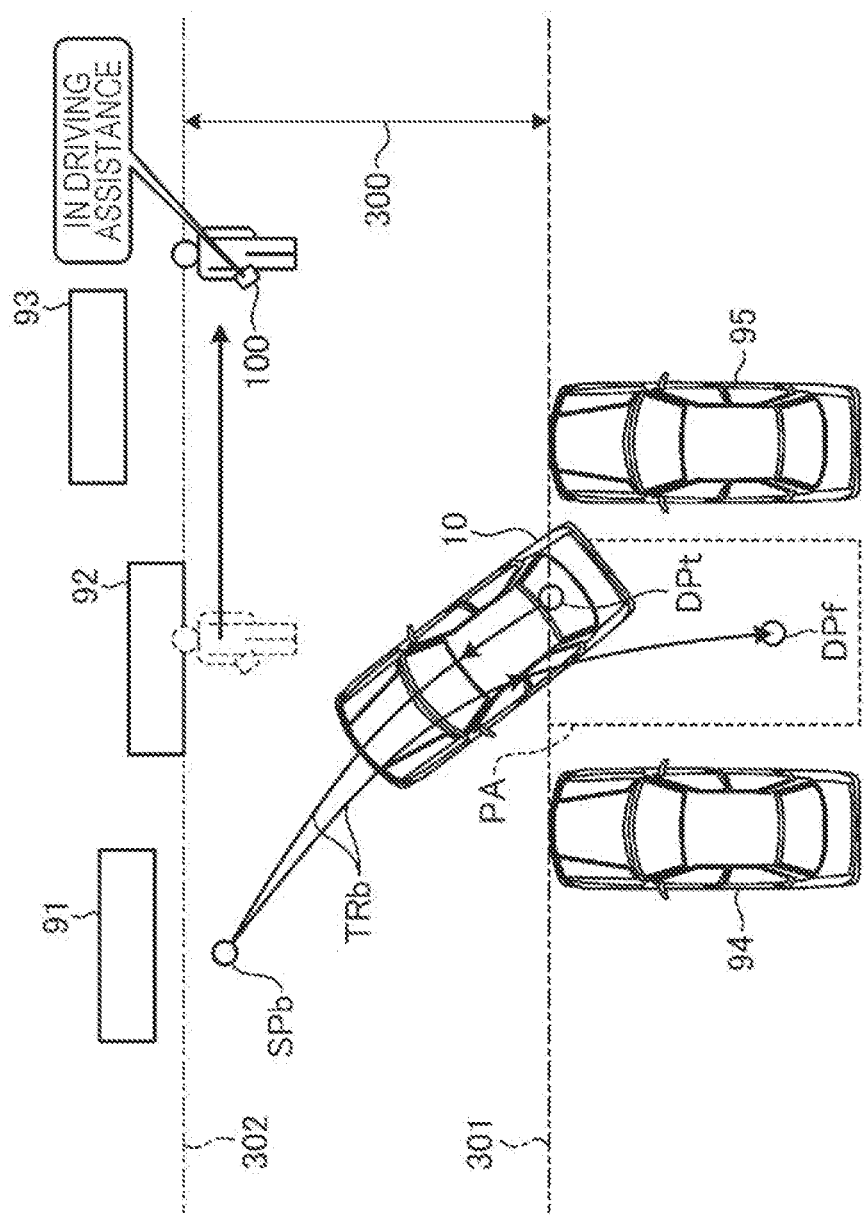
FIG. 9 is a schematic diagram describing an example of an operation of parking assistance by the driving assistance device according to the embodiment.

As illustrated in FIG. 9, the vehicle 10 moves backward on the remaining movement route TRa from the first steering wheel turn-back position SPa, moves to the temporary position DPt, and attempts to move forward on the movement route TRb toward the second steering wheel turn-back position SP.

The road width calculation unit 206 determines whether an obstacle detected in the detection area 310 in FIG. 7 is still being detected, for example, at the timing the vehicle 10 changes from backward movement to forward movement or at the timing the vehicle changes from forward movement to backward movement.

In this manner, the road width calculation unit 206 again confirms the situation of the obstacle at a predetermined timing such as the timing when the advancing direction of the vehicle 10 receiving driving assistance changes. Such a predetermined timing may be, for example, a timing at which a predetermined time has elapsed after the start instruction of the driving assistance is made by the driver or the like, other than the above timing.

In the example of FIG. 9, the driver who was initially staying at the get-off position moves to a position away from the vehicle 10. When no obstacle is detected at the predetermined timing as described above, the road width calculation unit 206 returns the boundary line 302m to the original boundary line 302 without the projection 302p. Thereafter, the movement control unit 208 continues the movement of the vehicle 10 on the movement route TRb and completes the parking of the vehicle 10 in the parking area PA which is the target position DPf.

On the other hand, there may be a case where another obstacle other than the driver or the like is detected in the detection area 310 set with respect to the vehicle 10 during the driving assistance. Such a case is illustrated in FIGS. 10 and 11.

Figure 10:
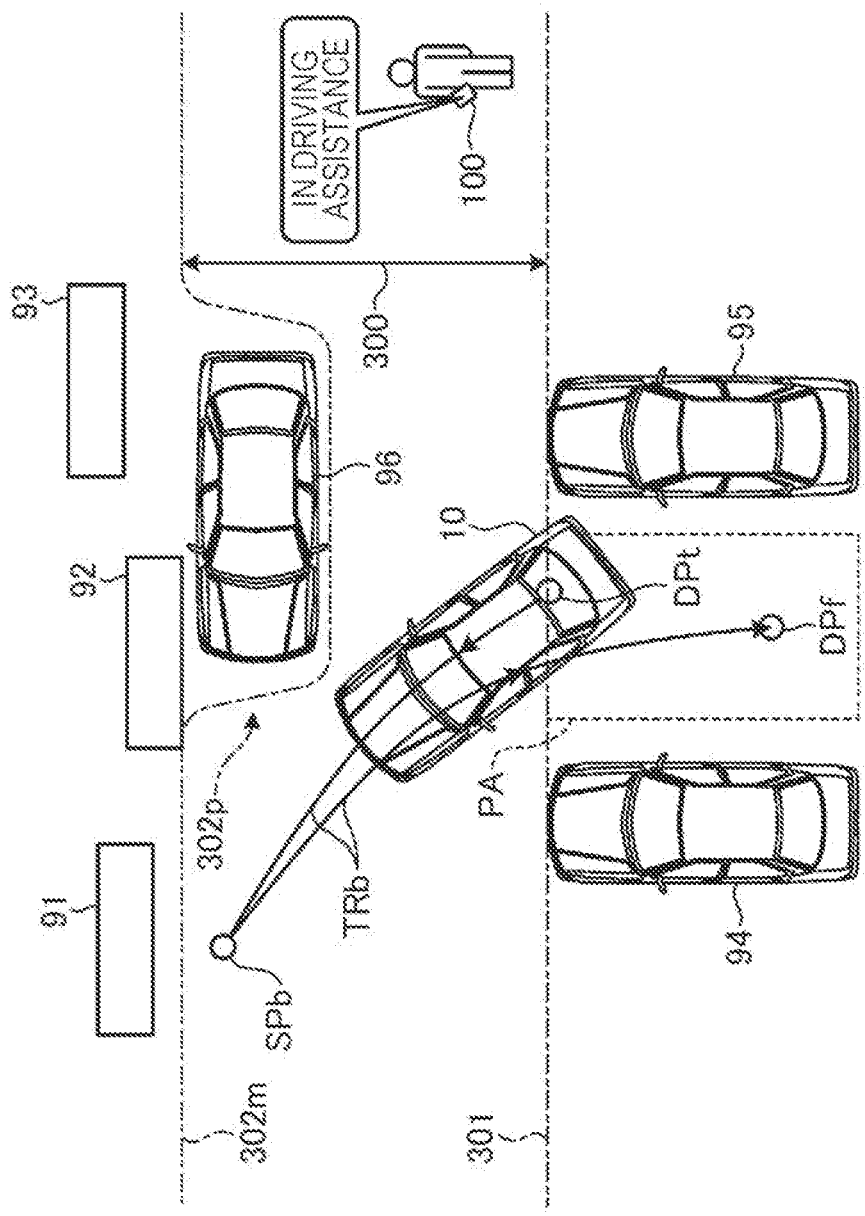
FIG. 10 is a schematic diagram describing another example of an operation of parking assistance by the driving assistance device according to the embodiment.
Figure 11:
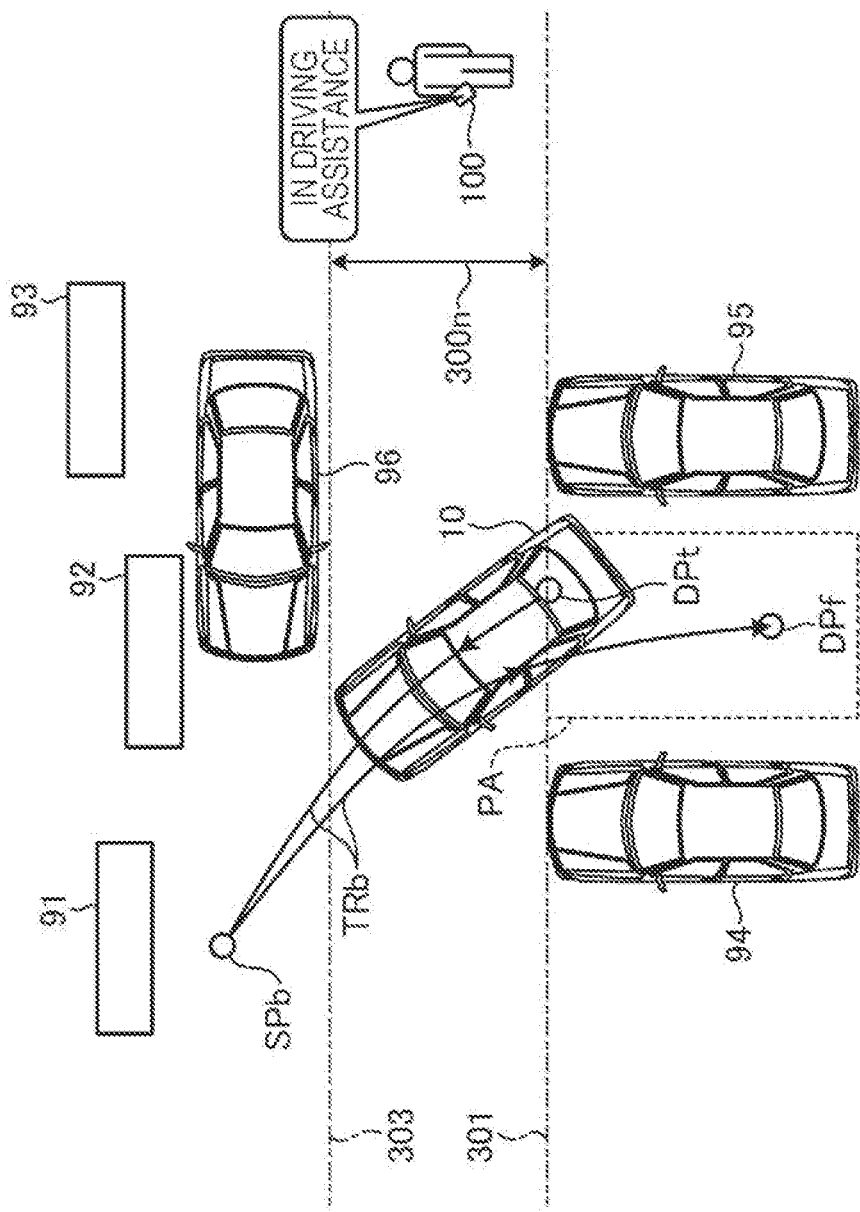
FIG. 11 is a schematic diagram describing another example of an operation of parking assistance by the driving assistance device according to the embodiment.

FIGS. 10 and 11 are schematic diagrams describing another example of an operation of parking assistance by the driving assistance device 20 according to the embodiment.

As illustrated in FIG. 10, it is assumed that another vehicle 96 stops in the vicinity of the boundary line 302 calculated by the road width calculation unit 206 of the vehicle 10 during the driving assistance of the vehicle 10 to the parking area PA. As a result, for example, it is assumed that the stopped vehicle 96 is detected in the detection area 310 of the vehicle 10 that has moved to the first steering wheel turn-back position SPa (see FIGS. 7 and 8) described above.

In this case, the road width calculation unit 206 sets a boundary line 302m having a projection 302p that projects a part of the boundary line 302 in the vicinity of the vehicle 96 as the second obstacle toward the vehicle 96 side and takes it into the boundary line 302 side. Thus, the vehicle 96 in the area sandwiched by the boundary lines 301, 320 is excluded to the region outside the boundary line 302m.

In addition, in FIG. 10, the vehicle 10 continues to move from the steering wheel turn-back position SPa to the temporary position DPt after the detection of the vehicle 96, and is about to change to forward movement toward the second steering wheel turn-back position SPb. At this timing as well, it is assumed that the vehicle 96 is still stopped at the initially detected position.

Since the vehicle 96 is still continuously detected as an obstacle, the road width calculation unit 206 calculates a boundary line 303 as a third boundary line that includes the end portion of the vehicle 96 on the vehicle 10 side and extends parallel to the end portion of the parking area PA on the entrance side and the boundary line 301, and sets an area sandwiched between the newly calculated boundary line 303 and the initially calculated boundary line 301 as a new road width 300n.

In the example of FIG. 10, a part of the movement route TRb on which the vehicle 10 will move, of the initially calculated movement routes TRa and TRb, is deviated from the newly set boundary lines 301, 303. Thus, the route calculation unit 207 calculates a new movement route so as to be within the area sandwiched by the boundary lines 301, 303 and the parking area PA.

When a new movement route cannot be calculated due to the road width 300n becoming too narrow or the like, the driving assistance device 20 determines that it is difficult to guide the vehicle 10 to the target position DPf and cancels (cancels) the driving assistance.

When canceling the driving assistance, the notification generation unit 202 generates a notification notifying the user of the portable terminal 100 of the cancellation of the driving assistance. The transmission/reception unit 203 transmits the notification to the portable terminal 100 and causes the display device of the portable terminal 100 to display the notification.

In the examples of FIGS. 5 to 11 described above, the case where the driving assistance device 20 performs driving assistance by backward parking has been described. However, even in the case of forward parking, forward or backward exiting, parallel parking by backward or forward movement, or parallel exiting by forward or backward movement, the driving assistance device 20 similarly assists the driving of the vehicle 10.

Process Example of Driving Assistance Device

Figure 12:
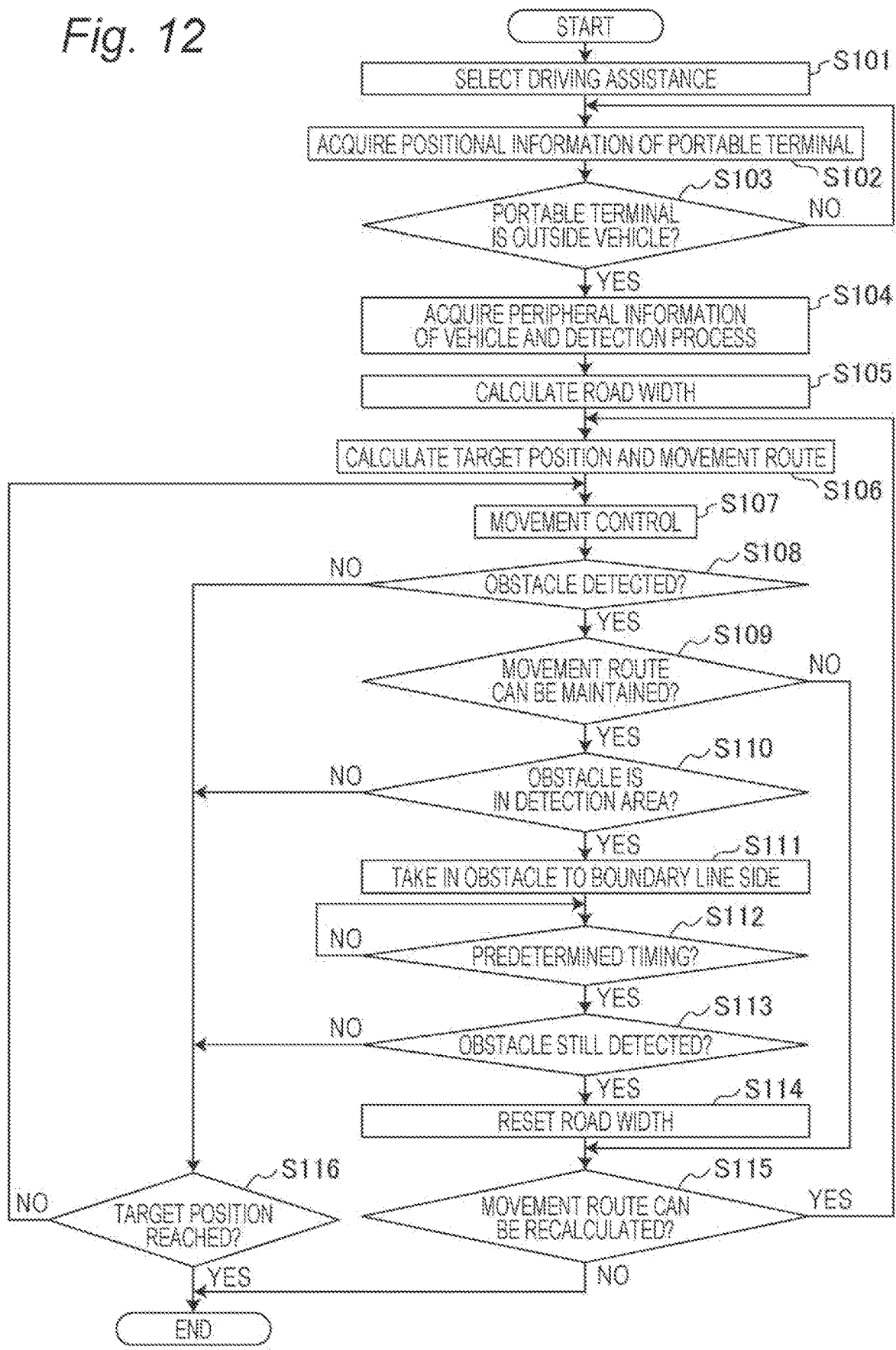
FIG. 12 is a flowchart illustrating an example of a procedure of a driving assistance process by the driving assistance device according to the embodiment.

Next, an example of a driving assistance process by the driving assistance device 20 according to the embodiment will be described with reference to FIG. 12. FIG. 12 is a flowchart illustrating an example of a procedure of a driving assistance process by the driving assistance device 20 according to the embodiment.

As illustrated in FIG. 12, when selection to provide driving assistance is made from the input unit 32 of the monitor device 30 (step S101), the transmission/reception unit 203 acquires positional information from the portable terminal 100 (step S102), and determines whether or not the portable terminal 100 has moved to the outside of the vehicle 10 (step S103). The transmission/reception unit 203 continues to acquire the positional information (step S102) until detection is made that the portable terminal 100 has moved to the outside of the vehicle 10 (step S103: No).

If detection is made that the portable terminal 100 has moved to the outside of the vehicle 10 (step S103: Yes), the acquisition unit 204 of the driving assistance device 20 acquires peripheral information of the vehicle 10 from the distance measuring unit 14 and the imaging unit 16, and the detection unit 205 performs various types of detection processes necessary for driving assistance (step S104).

Specifically, the detection unit 205 detects the presence or absence of an obstacle or the like at the periphery of the vehicle 10 based on the acquired peripheral information of the vehicle 10, and detects the position where the vehicle 10 can stop after detecting the parking area PA or exiting the parking area PA according to the content of the selected driving assistance.

Note that acquisition of the peripheral information by the acquisition unit 204 and various types of detection by the detection unit 205 may be started before this timing. In addition, the acquisition unit 204 continues to acquire the peripheral information at least until the driving assistance process is terminated. Furthermore, the detection unit 205 continues various types of detection processes necessary for the driving assistance, such as detection of an obstacle at the periphery of the vehicle 10, at least until the driving assistance process is terminated.

The road width calculation unit 206 sets the boundary line 301 on the parking area PA side based on the detection result by the detection unit 205, sets the boundary line 302 on the side facing the parking area PA, and calculates the area sandwiched by the boundary lines 301, 302 as the road width 300 (step S105).

The route calculation unit 207 calculates a target position DPf such as a predetermined position in the parking area PA or a stop position of the vehicle 10 after exiting the parking area PA based on the detection result by the detection unit 205, and calculates a movement route TR from the departure position PP of the vehicle 10 to the target position DPf via the steering wheel turn-back position SP in some cases (step S106).

The movement control unit 208 controls the movement of the vehicle 10 according to the movement route TR calculated by the route calculation unit 207 (step S107).

During the driving assistance of the vehicle 10, based on the detection result of the detection unit 205, the movement control unit 208 monitors whether or not an obstacle is detected in the vicinity of the vehicle 10 moving on the movement route TR, and monitors whether or not an obstacle is detected in the detection area 310 set in the vehicle 10 (step S108).

If no obstacle is detected (step S108: No), the movement control unit 208 continues the movement of the vehicle 10 on the movement route TR (step S107) until the vehicle 10 reaches the target position DPf (step S116: No).

If an obstacle is detected in the vicinity of the vehicle 10 moving on the movement route TR or in the detection area 310 (step S108: Yes), the movement control unit 208 determines whether or not there is a risk of collision with an obstacle or the like even if the vehicle 10 is moved while maintaining the calculated movement route TR (step S109).

If it is difficult to maintain the movement route TR (step S109: No), the route calculation unit 207 determines whether or not a movement route that avoids a newly detected obstacle can be recalculated (step S115). If the movement route can be recalculated (step S115: Yes), the route calculation unit 207 recalculates the target position, the movement route of the vehicle 10, and the like with the current position of the vehicle 10 as a new departure position, and repeats the processes after step S106. If it is difficult to recalculate the movement route (step S115: Yes), the driving assistance device 20 cancels the driving assistance.

If the movement route TR can be maintained (step S109: Yes), the road width calculation unit 206 determines whether or not the newly detected obstacle is located within the detection area 310 set in the vehicle 10 (step S110). If the obstacle is located out of the detection area 310 (step S110: No), the movement control unit 208 continues the movement of the vehicle 10 on the movement route TR (step S107) until the vehicle 10 reaches the target position DPf (step S116: No).

If the obstacle is located in the detection area 310 (step S110: Yes), the road width calculation unit 206 resets the boundary line 302 on the side facing the parking area PA to the boundary line 302m including the projection 302p that takes in the obstacle (step S111).

In addition, the road width calculation unit 206 determines whether or not a predetermined timing such as a timing at which the advancing direction of the vehicle 10 moving on the movement route TR changes or a timing at which the predetermined time has elapsed from the start instruction of the driving assistance has been reached (step S112). The road width calculation unit 206 waits until a predetermined timing is reached (step S112: No).

When the predetermined timing is reached (step S112: Yes), the road width calculation unit 206 determines whether or not the obstacle detected in the process of step S108 is still being detected (step S113). If no obstacle has been detected (step S113: No), the movement control unit 208 continues to move the vehicle 10 on the movement route TR (step S107) until the vehicle 10 reaches the target position DPf (step S116: No).

If an obstacle is still being detected at the predetermined timing (step S113: Yes), the road width calculation unit 206 calculates a boundary line 303 including an end portion of the obstacle on the vehicle 10 side in place of the boundary line 302m including the projection 302p, and resets an area sandwiched by the boundary lines 301, 303 as a new road width 300n (step S114).

If the movement route can be recalculated based on the reset road width 300n (step S115: Yes), the route calculation unit 207 repeats the processes after step S106, and if it is difficult to recalculate the movement route (step S115: Yes), the driving assistance device 20 cancels the driving assistance.

When the vehicle 10 reaches the target position DPf (step S116: Yes) or when the driving assistance is canceled due to any of the above reasons (step S115: No), the driving assistance device 20 terminates the driving assistance.

The driving assistance process by the driving assistance device 20 of the embodiment is thereby terminated.

Overview

A driving assistance device assists driving of a vehicle based on peripheral information of the vehicle from various sensors such as a distance measuring unit and an imaging unit. In recent years, development is progressing in a driving assistance device that remotely assists entering or exiting of a vehicle to or from a parking area in a state where a driver has got off the vehicle.

In addition, the driving assistance device sets a road width in which the vehicle can move based on, for example, an obstacle or the like at the periphery of the vehicle, and then guides the vehicle according to a movement route passing through the area.

However, in remote driving assistance, there is a case where a driver who got off the vehicle is detected as an obstacle at the periphery of the vehicle, and a road width is set based on the driver. In such a case, the road width is set to be unnecessarily narrow, and the steering wheel turn-back may be repeated many times in order to guide the vehicle to the target position, or the driving assistance may be canceled because the vehicle cannot be guided to the target position.

In order to avoid this, for example, when a new sensor or the like is attached to the vehicle in order to distinguish the driver from the obstacle, the system configuration becomes complicated, the control of the system becomes complex, and the cost of the driving assistance device increases.

According to the driving assistance device 20 of the embodiment, after the start of the driving assistance, when a new obstacle is detected in the detection area 310 set on the inner side of the boundary lines 301, 302 and in the detection area 310 set on the boundary line 302 side with respect to the vehicle 10 in the advancing direction of the vehicle 10, and the above-described obstacle is continuously detected at a time point the vehicle 10 moving on the movement route TR reaches a predetermined timing, an area sandwiched between the boundary line 303 including an end portion of the obstacle on the vehicle 10 side and the boundary line 301 is calculated as a new road width 300n.

As a result, in a case where the obstacle is a driver or the like who got off the vehicle 10, it is possible to suppress inadvertent resetting of the boundary line with reference to the driver and narrowing of the road width. In addition, if the obstacle is a driver or the like, it is difficult to consider that the obstacle continues to stay in the vicinity of the vehicle 10 moving by driving assistance. Therefore, by maintaining the initially calculated boundary line 302 until a predetermined timing, the possibility that the vehicle 10 can be guided to the target position DPf by the initially calculated movement route TR while maintaining the original road width 300 increases.

Therefore, even when the driver is detected as an obstacle, it is possible to suppress the cancellation of the driving assistance. In order to distinguish between the driver and the obstacle, a new sensor or the like does not need to be introduced, the configuration and control of the driving assistance device 20 can be simplified, and an increase in cost can be suppressed.

In the embodiment described above, the driving assistance device 20 is mounted on the vehicle 10, but the driving assistance device 20 may not necessarily be mounted on the vehicle 10. For example, the driving assistance device may acquire peripheral information of the vehicle from various sensors at a position away from the vehicle to remotely perform driving assistance of the vehicle.

A driving assistance device is a driving assistance device that provides driving assistance to a vehicle including a sensor that collects peripheral information in accordance with an instruction from a terminal possessed by a user of the vehicle, the driving assistance device including: a detection unit that detects an obstacle and a parking area at a periphery of the vehicle based on the peripheral information from the sensor; a road width calculation unit that calculates, as a road width in which the vehicle is movable, an area sandwiched by a first boundary line extending in a predetermined direction including an end portion of the parking area on an entrance side and a second boundary line extending in the predetermined direction including an end portion of the first obstacle on the vehicle side facing the end portion of the parking area; a route calculation unit that calculates a movement route of the vehicle through the area sandwiched by the first and second boundary lines and the parking area to a target position, the parking area being a departure position or the target position; and a movement control unit that moves the vehicle along the movement route; where when a second obstacle is detected on the inner side of the first and second boundary lines and on the second boundary line side with respect to the vehicle in an advancing direction of the vehicle after the start of the driving assistance, and the second obstacle is continuously detected at a time point the vehicle moving on the movement route reaches a predetermined timing, the road width calculation unit calculates an area sandwiched by a third boundary line extending in the predetermined direction including an end portion of the second obstacle on the vehicle side and the first boundary line as a new road width.

According to this configuration, even when the driver is detected as an obstacle, it is possible to suppress cancellation of the driving assistance.

Furthermore, in the driving assistance device described above, the predetermined direction in which the first and second boundary lines extend is a direction parallel to an end portion of the parking area on the entrance side.

According to this configuration, it is possible to control the vehicle with respect to the parking area in which the extending direction of the boundary line is determined according to the direction of the parking area, and it is possible to simplify processes such as calculation of the boundary line in the driving assistance device.

Furthermore, in the driving assistance device described above, the predetermined timing in the vehicle moving on the movement route is a timing at which the vehicle changes from backward movement to forward movement or a timing at which the vehicle changes from forward movement to backward movement.

According to this configuration, the timing of reconfirming the situation of the obstacle can be measured in synchronization with the operation of the vehicle 10 during the driving assistance.

Furthermore, in the driving assistance device described above, the predetermined timing in the vehicle moving on the movement route is a timing at which a predetermined time has elapsed after the start of the driving assistance is instructed.

According to this configuration, the situation of the obstacle can be reconfirmed at a constant timing every time, and the process in the driving assistance device can be simplified.

A vehicle is a vehicle mounted with a sensor that collects peripheral information; and a driving assistance device that provides driving assistance in accordance with an instruction from a terminal possessed by a user, where the driving assistance device includes a detection unit that detects an obstacle and a parking area of a periphery of the vehicle based on the peripheral information from the sensor; a road width calculation unit that calculates, as a road width in which the vehicle is movable, an area sandwiched by a first boundary line extending in a predetermined direction including an end portion of the parking area on an entrance side and a second boundary line extending in the predetermined direction including an end portion of the first obstacle on the vehicle side facing the end portion of the parking area; a route calculation unit that calculates a movement route of the vehicle through the area sandwiched by the first and second boundary lines and the parking area to a target position, the parking area being a departure position or the target position; and a movement control unit that moves the vehicle along the movement route; where when a second obstacle is detected on the inner side of the first and second boundary lines and on the second boundary line side with respect to the vehicle in an advancing direction of the vehicle after the start of the driving assistance, and the second obstacle is continuously detected at a time point the vehicle moving on the movement route reaches a predetermined timing, the road width calculation unit calculates an area sandwiched by a third boundary line extending in the predetermined direction including an end portion of the second obstacle on the vehicle side and the first boundary line as a new road width.

According to this configuration, even when the driver is detected as an obstacle, it is possible to suppress cancellation of the driving assistance.

Furthermore, in the vehicle described above, the predetermined direction in which the first and second boundary lines extend is a direction parallel to an end portion of the parking area on the entrance side.

According to this configuration, it is possible to control the vehicle with respect to the parking area in which the extending direction of the boundary line is determined according to the direction of the parking area, and it is possible to simplify processes such as calculation of the boundary line in the driving assistance device.

Furthermore, in the vehicle described above, the predetermined timing in the vehicle moving on the movement route is a timing at which the vehicle changes from backward movement to forward movement or a timing at which the vehicle changes from forward movement to backward movement.

According to this configuration, the timing of reconfirming the situation of the obstacle can be measured in synchronization with the operation of the vehicle 10 during the driving assistance.

Furthermore, in the vehicle described above, the predetermined timing in the vehicle moving on the movement route is a timing at which a predetermined time has elapsed after the start of the driving assistance is instructed.

According to this configuration, the situation of the obstacle can be reconfirmed at a constant timing every time, and the process in the driving assistance device can be simplified.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A driving assistance device that provides driving assistance to a vehicle including a sensor that collects peripheral information in accordance with an instruction from a terminal possessed by a user of the vehicle, the driving assistance device comprising:
   a detection unit that detects an obstacle and a parking area at a periphery of the vehicle based on the peripheral information from the sensor;
   a road width calculator that calculates, as a road width in which the vehicle is movable, an area sandwiched by a first boundary line extending in a predetermined direction including an end portion of the parking area on an entrance side and a second boundary line extending in the predetermined direction including an end portion of the first obstacle on the vehicle side facing the end portion of the parking area;
   a route calculator that calculates a movement route of the vehicle through the area sandwiched by the first and second boundary lines and the parking area to a target position, the parking area being a departure position or the target position; and
   a movement controller that moves the vehicle along the movement route, wherein
   when a second obstacle is detected on the inner side of the first and second boundary lines and on the second boundary line side with respect to the vehicle in an advancing direction of the vehicle after the start of the driving assistance, and the second obstacle is continuously detected at a time point the vehicle moving on the movement route reaches a predetermined timing, the road width calculator calculates an area sandwiched by a third boundary line extending in the predetermined direction including an end portion of the second obstacle on the vehicle side and the first boundary line as a new road width.

2. The driving assistance device according to claim 1, wherein the predetermined direction in which the first and second boundary lines extend is a direction parallel to an end portion of the parking area on the entrance side.

3. The driving assistance device according to claim 1, wherein the predetermined timing in the vehicle moving on the movement route is a timing at which the vehicle changes from backward movement to forward movement or a timing at which the vehicle changes from forward movement to backward movement.

4. The driving assistance device according to claim 1, the predetermined timing in the vehicle moving on the movement route is a timing at which a predetermined time has elapsed after the start of the driving assistance is instructed.

5. A vehicle mounted with a sensor that collects peripheral information; and a driving assistance device that provides driving assistance in accordance with an instruction from a terminal possessed by a user, wherein the driving assistance device includes,
   a detection unit that detects an obstacle and a parking area of a periphery of the vehicle based on the peripheral information from the sensor,
   a road width calculator that calculates, as a road width in which the vehicle is movable, an area sandwiched by a first boundary line extending in a predetermined direction including an end portion of the parking area on an entrance side and a second boundary line extending in the predetermined direction including an end portion of the first obstacle on the vehicle side facing the end portion of the parking area,
   a route calculator that calculates a movement route of the vehicle through the area sandwiched by the first and second boundary lines and the parking area to a target position, the parking area being a departure position or the target position, and
   a movement controller that moves the vehicle along the movement route, and
   when a second obstacle is detected on the inner side of the first and second boundary lines and on the second boundary line side with respect to the vehicle in an advancing direction of the vehicle after the start of the driving assistance, and the second obstacle is continuously detected at a time point the vehicle moving on the movement route reaches a predetermined timing, the road width calculator calculates an area sandwiched by a third boundary line extending in the predetermined direction including an end portion of the second obstacle on the vehicle side and the first boundary line as a new road width.

6. The vehicle according to claim 5, wherein the predetermined direction in which the first and second boundary lines extend is a direction parallel to an end portion of the parking area on the entrance side.

7. The vehicle according to claim 5, wherein the predetermined timing in the vehicle moving on the movement route is a timing at which the vehicle changes from backward movement to forward movement or a timing at which the vehicle changes from forward movement to backward movement.

8. The vehicle according to claim 5, the predetermined timing in the vehicle moving on the movement route is a timing at which a predetermined time has elapsed after the start of the driving assistance is instructed.

9. The driving assistance device according to claim 1, wherein the movement controller autonomously controls the vehicle along the movement route.

10. The vehicle according to claim 5, wherein the movement controller autonomously controls the vehicle along the movement route.

11. The driving assistance device according to claim 1, wherein the first boundary line extends along the entrance or exit of the parking area, the second boundary line extends parallel to the first boundary line, and the third boundary line lies between the second obstacle and the first boundary line.

12. The vehicle according to claim 5, wherein the first boundary line extends along the entrance or exit of the parking area, the second boundary line extends parallel to the first boundary line, and the third boundary line lies between the second obstacle and the first boundary line.

* * * * *